(12) United States Patent
Root et al.

(10) Patent No.: US 11,505,444 B1
(45) Date of Patent: Nov. 22, 2022

(54) REFRIGERATOR APPLIANCE AND METHOD FOR MEASURING CONTENTS IN A CONTAINER

(71) Applicant: Haier US Appliance Solutions, Inc., Wilmington, DE (US)

(72) Inventors: Steven Keith Root, Buckner, KY (US); Steven Phang, Coral Springs, FL (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/477,628

(22) Filed: Sep. 17, 2021

(51) Int. Cl.
- *B67D 1/08* (2006.01)
- *G01F 23/296* (2022.01)
- *G01F 23/292* (2006.01)
- *F25D 23/12* (2006.01)

(52) U.S. Cl.
CPC ......... *B67D 1/0888* (2013.01); *F25D 23/126* (2013.01); *G01F 23/292* (2013.01); *G01F 23/296* (2013.01)

(58) Field of Classification Search
CPC .. G01F 23/28; B67D 1/1238; B67D 2001/009
See application file for complete search history.

(56) References Cited

U.S. PATENT DOCUMENTS

| | | | | |
|---|---|---|---|---|
| 6,082,419 A * | 7/2000 | Skell | | B67D 1/1236 141/351 |
| 6,688,134 B2 * | 2/2004 | Barton | | B67D 1/00 141/351 |
| 6,705,356 B2 * | 3/2004 | Barton | | B67D 1/124 141/2 |
| 6,789,585 B1 * | 9/2004 | Janke | | G07F 13/02 141/351 |
| 7,673,661 B2 * | 3/2010 | Chase | | F25D 23/126 250/221 |
| 7,743,801 B2 * | 6/2010 | Janardhanam | | F25D 23/126 141/351 |
| 8,109,301 B1 * | 2/2012 | Denise | | F25D 23/126 222/113 |
| 8,167,004 B2 * | 5/2012 | Lee | | B67D 1/0888 141/96 |
| 8,327,889 B2 * | 12/2012 | Ashrafzadeh | | G07F 13/06 141/192 |
| 8,353,321 B2 * | 1/2013 | Agam | | B67D 1/124 141/94 |
| 8,443,614 B2 * | 5/2013 | Kim | | F25D 29/00 141/370 |
| 8,695,646 B2 * | 4/2014 | Agam | | G01S 15/87 141/94 |
| 8,935,935 B2 * | 1/2015 | Waugh | | F17D 3/00 62/3.63 |

(Continued)

FOREIGN PATENT DOCUMENTS

| GB | 2595330 A * 11/2021 | ........... B67D 1/0888 |
|---|---|---|
| KR | 20150073603 A 7/2015 | |

*Primary Examiner* — Timothy L Maust
(74) *Attorney, Agent, or Firm* — Dority & Manning, P.A.

(57) ABSTRACT

An appliance, such as a refrigerator appliance, and controller configured to perform operations of a method for measuring contents in a container are provided. The operations include receiving, from a sensor, one or more signals indicative of a height of contents in a container, and determining a contents volume in the container based at least on the height of contents in the container.

17 Claims, 4 Drawing Sheets

(56) References Cited

U.S. PATENT DOCUMENTS

| | | | |
|---|---|---|---|
| 9,057,556 B2 * | 6/2015 | Ashrafzadeh | B67D 3/0003 |
| 9,487,384 B1 * | 11/2016 | Denise | F25D 29/001 |
| 9,719,720 B2 | 8/2017 | Seo et al. | |
| 9,828,228 B2 * | 11/2017 | Chase | B67D 1/0878 |
| 10,752,487 B2 * | 8/2020 | Rosenlund | B67D 1/0882 |
| 10,829,361 B1 * | 11/2020 | Denise | G07F 13/10 |
| 10,858,235 B2 * | 12/2020 | Jung | B67D 3/0093 |
| 10,947,104 B2 * | 3/2021 | Chernov | B67D 1/1236 |
| 11,117,793 B1 * | 9/2021 | Khan | B67D 1/0888 |
| 2008/0105331 A1 * | 5/2008 | You | B67D 1/0888 |
| | | | 141/95 |
| 2009/0178728 A1 * | 7/2009 | Cochran | B65B 57/145 |
| | | | 141/39 |
| 2016/0207753 A1 * | 7/2016 | Choi | B67D 1/1238 |
| 2017/0010034 A1 | 1/2017 | Doering et al. | |
| 2021/0009402 A1 * | 1/2021 | Moskowitz | B67D 1/0888 |
| 2021/0053812 A1 * | 2/2021 | Chernov | B67D 1/0888 |

* cited by examiner

REFRIGERATOR APPLIANCE AND METHOD FOR MEASURING CONTENTS IN A CONTAINER

FIELD

The present disclosure relates generally to systems and methods for obtaining measurements from an appliance. The present disclosure relates particularly to systems and methods for obtaining volume measurements of a fluid from an appliance.

BACKGROUND

Appliances, such as refrigerators, generally include one or more cabinets defining chambers for the receipt of food items for storage. Refrigerator appliances may also include features for dispensing ice and/or liquid water. To provide ice and/or liquid water, a dispenser is typically positioned on a door of the appliance. The user positions a container proximate the dispenser, and ice and/or liquid water are deposited into the container depending upon the user's selection. A paddle or other type switch may be provided whereby the user may make a selection. Typically, the liquid water is chilled by routing the liquid water through one of the refrigerated chambers.

Measuring the volume of wet or dry contents of a vessel is a common kitchen task when cooking or baking. Known methods for obtaining measurements of wet or dry contents include utilizing a measuring cup or other device having markers indicative of volume or other measurement. Markings on the device are generally small so that many reference points can be included for accurate measurements. However, accurate measurements are generally dependent on user factors, such as from where a user views the markers to obtain the measurement, the consistency of angle or orientation from which the user views the markers, or the consistency among users of obtaining measurements. Such measurements may be difficult to read, or difficult to read with repeated consistency. Additionally, such measurements may be difficult to read for users with impaired vision.

Conventional measurement devices and methods generally require specialized vessels, which may limit the size, shape, capacity, volumetric unit, or quantity of measurement devices (e.g., measuring cups) that a user may have available. Such limitations may further limit the speed and efficiency of the measuring task. For instance, a user may generally be inhibited from measuring more than one ingredient at the same time unless more than one measuring device is utilized. In another instance, a user may be inhibited from measuring more than one ingredient at a time due to a desire to keep wet and dry ingredients separate from one another, which may lead to a desire or necessity to utilize separate measurement devices for wet and dry ingredients.

Users generally fill and remove desired contents from a measurement vessel, such as a measuring cup, until the desired volume is observed. Users may repeatedly fill and remove contents until the desired measurement is achieved. Measurements may be subjective to the user, such as dependent on whether the user has viewed the measurement from a consistent view or angle, or whether the user is consistent between measurements, or whether a plurality of users may provide consistent measurements.

Accordingly, there is a need for an improved method and system for obtaining measurements of volumes of contents.

BRIEF DESCRIPTION

Aspects and advantages of the invention will be set forth in part in the following description, or may be obvious from the description, or may be learned through practice of the invention.

The present subject matter provides an appliance including a cabinet defining a chamber. A door is mounted to the cabinet and configured for permitting selective access to the chamber of the cabinet. A dispenser defines a dispensing recess and a sensor is disposed at the dispensing recess. The sensor is configured to receive one or more signals indicative of a presence of a container proximate the dispensing recess and a height of contents in the container. One or more control devices is in operative communication with a user input panel and the sensor. The one or more control devices is configured to receive one or more signals from the sensor indicative of the height of contents in the container; and determine a contents volume in the container based on the height of contents in the container.

Another aspect of the present subject matter provides a controller for an appliance. The controller includes one or more memory devices configured to store instructions that, when executed by one or more processors, causes the controller to perform operations. The operations include receiving, from a sensor, a first signal indicative of a container positioned at a dispensing recess of the appliance; receiving, from the sensor, a second signal indicative of a height of contents in the container; and determining a contents volume in the container based at least on the height of contents in the container.

Variations and modifications may be made to these example embodiments of the present disclosure. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment may be used with another embodiment to yield a still further embodiment. Thus, it is intended that the present invention covers such modifications and variations as come within the scope of the appended claims and their equivalents.

Embodiments of methods and systems for determining volume of contents in a container are provided. Embodiments provided herein may reduce or remove a need for specialized measurement devices and/or provide electronically interpreted measurement results. Embodiments provided herein may reduce or eliminate subjectivity associated with determining volumes of contents in a container, such as, but not limited to, subjectivity based on consistency of viewing angle, consistency between users, or consistency between measurements. Embodiments provided herein may output measurements that overcome issues associated with vision impairment that may disable a user from reading measurements at a measurement device. Embodiments provided herein may further allow for quicker sequential measurements without necessitating multiple, separate, measurement devices, or cleaning and reuse of a single measurement device.

Example aspects of the present disclosure are directed to appliances with one or more sensors configured to determine a level of fluid in a container. The sensor may further be configured to determine various geometries of the container. The sensor may be associated with a fluid dispensing system, such as a liquid water and/or ice delivery system. The sensor(s) may be configured to detect a presence of a container positioned proximate the dispensing system. The sensor may further be configured to determine a height of the container and/or a level of contents within the container. In example embodiments, the sensor may be an ultrasonic sensor positioned on an upper portion of the dispensing system. The sensor may be positioned parallel to a fluid stream, such as liquid water, dispensed by the dispenser and configured to transmit signals corresponding to the fluid stream. To obtain a measurement or reading of a volume of contents in a container, a user places the container at the dispenser. The user provides an input at a user input panel. The sensor determines the contents volume in the container. In certain embodiments, once the container has been detected, a height of the contents may be determined. The sensor may send a signal indicative of the height of the contents to the control system. The control system may determine a contents volume based at least in part on the signal.

In certain embodiments, the sensor is further configured to obtain a height and/or other geometry of the container, such as may be indicative of container volume, and the control system is configured to store the container geometry as calibration data. The control system may be configured to determine the volume of contents in the container based on the calibration data and the height of contents in the container.

In still certain embodiments, the sensor is configured to generate a plurality of signals that are received by the control system. The plurality of signals is indicative of various calibrated levels or heights of contents in a calibrated container. The user inputs volumes associated with the predetermined heights of fluid obtained by the sensor. The control system may store and correlate the predetermined volumes and content heights and determine the volume of contents in the container based on a transfer function, interpolation, or extrapolation of the calibration data.

Figure 1:
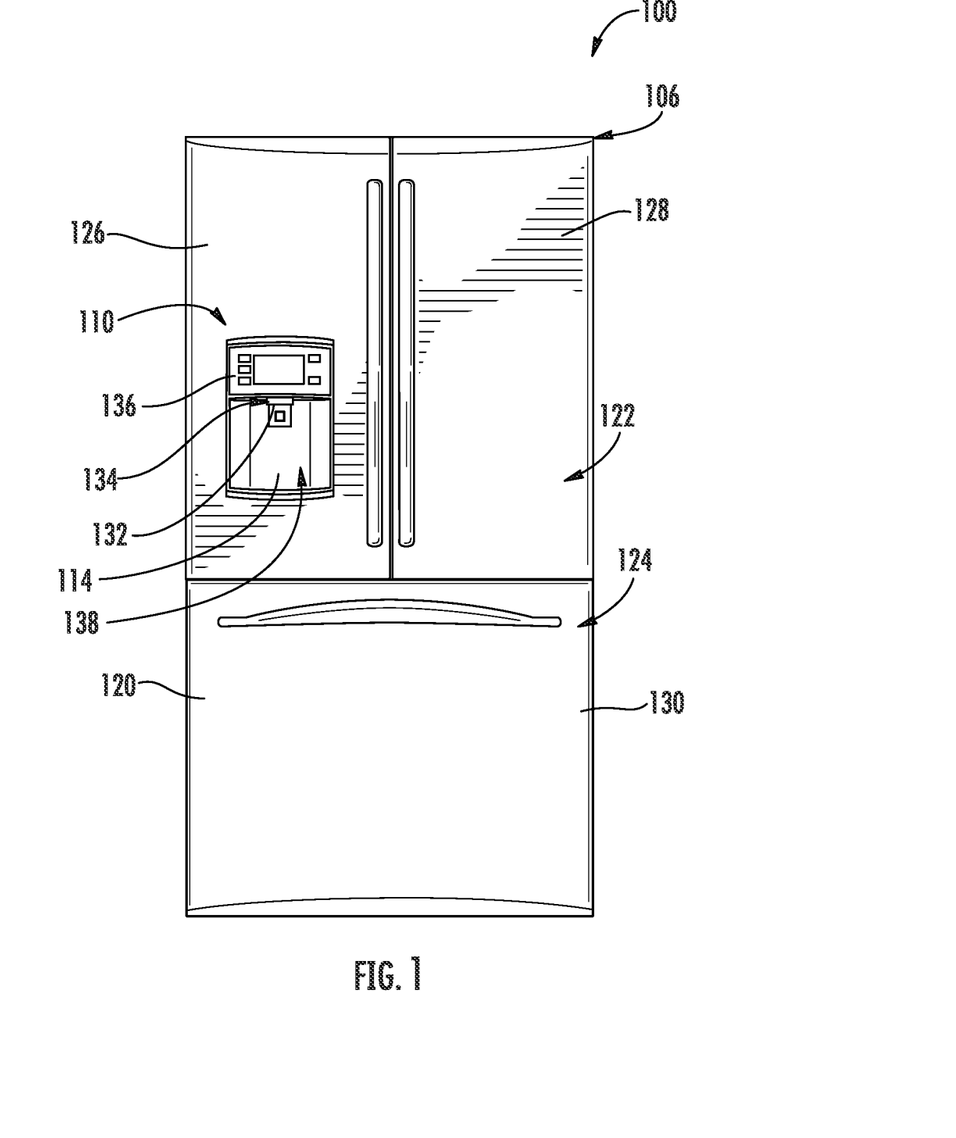
FIG. 1 provides a front, elevation view of an appliance according to example embodiments of the present disclosure.

Referring now to the figures, FIG. 1 depicts a front view of an example embodiment of an appliance 100. The appliance 100 may particularly form a refrigerator appliance. The appliance 100 includes a cabinet or housing 120 defining an upper fresh food chamber 122 and a lower freezer chamber 124 arranged below the fresh food chamber 122. As such, appliance 100 may generally be referred to as a bottom-mount refrigerator appliance. In the exemplary embodiment, housing 120 also defines a mechanical compartment (not shown) for receipt of a sealed cooling system. Using the teachings disclosed herein, one of skill in the art will understand that the present disclosure may be used with other types of refrigerator appliances (e.g., side-by-sides or top-mounts), freezer appliances, dishwashing appliances, clothes washing appliances, dryers, ovens or stoves, fluid dispensers generally, or other appropriate appliances. Consequently, the description set forth herein is for illustrative purposes only and is not intended to limit the invention to any particular style or arrangement of appliance.

Refrigerator doors 126, 128 are rotatably hinged to an edge of housing 120 for accessing fresh food compartment 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Appliance 100 includes a dispensing assembly 110 for dispensing liquid water and ice. Dispensing assembly 110 includes a dispenser 114 positioned on an exterior portion of appliance 100. Dispenser 114 includes a discharging outlet 134 for accessing ice and liquid water. Dispensing assembly 110 further includes a sensor 112 positioned on discharging outlet 134. As will be described in more detail below, sensor 112 may be configured to detect a presence of a container positioned within dispensing assembly 110, and to detect the top lip of the container. A user interface panel 136 is provided for controlling the mode of operation. For example, user interface panel 136 includes a water dispensing button (not labeled) and an ice-dispensing button (not labeled) for selecting a desired mode of operation such as crushed, non-crushed ice, or liquid water, etc.

Discharging outlet 134 is an external part of dispenser 114, and is mounted in a dispensing recess or recessed portion 138 defined in an outside surface of refrigerator door 126. Recessed portion 138 is positioned at a predetermined elevation convenient for a user to access ice or liquid water and enabling the user to access ice or liquid water without the need to bend-over and without the need to access freezer chamber 124. In the exemplary embodiment, recessed portion 138 is positioned at a level that approximates the chest level of a user.

Operation of the appliance 100 is regulated by a control device or controller 300 that is operatively coupled to user interface panel 136 and/or sensor 112. The controller 300 may include one or more processors 314 and one or more memory devices 316. The one or more memory devices 316 may be configured to store instructions that, when executed by the one or more processors 314, causes the refrigeration appliance 100 to perform operations such as provided below. The memory device(s) 316 may be configured to store calibration data, data corresponding to one or more signals, transfer functions, charts, tables, schedules, or determined values such as provided herein.

Panel 136 provides selections for user manipulation of the operation of appliance 100 such as e.g., selections between whole or crushed ice, chilled liquid water or other fluid, and/or determining a volume or other measurement of contents in a container, such as further described herein. In response to user manipulation of the user interface panel 136, the controller 300 operates various components of the appliance 100. The controller 300 may be positioned in a variety of locations throughout appliance 100. In the illustrated embodiment shown in FIG. 1, the controller 300 is located within or beneath the user interface panel 136 on door 126. In such an embodiment, input/output ("I/O") signals may be routed between controller 300 and various operational components of appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface 136 may be in communication with the controller 300 via one or more signal lines or shared communication busses.

Figure 2:
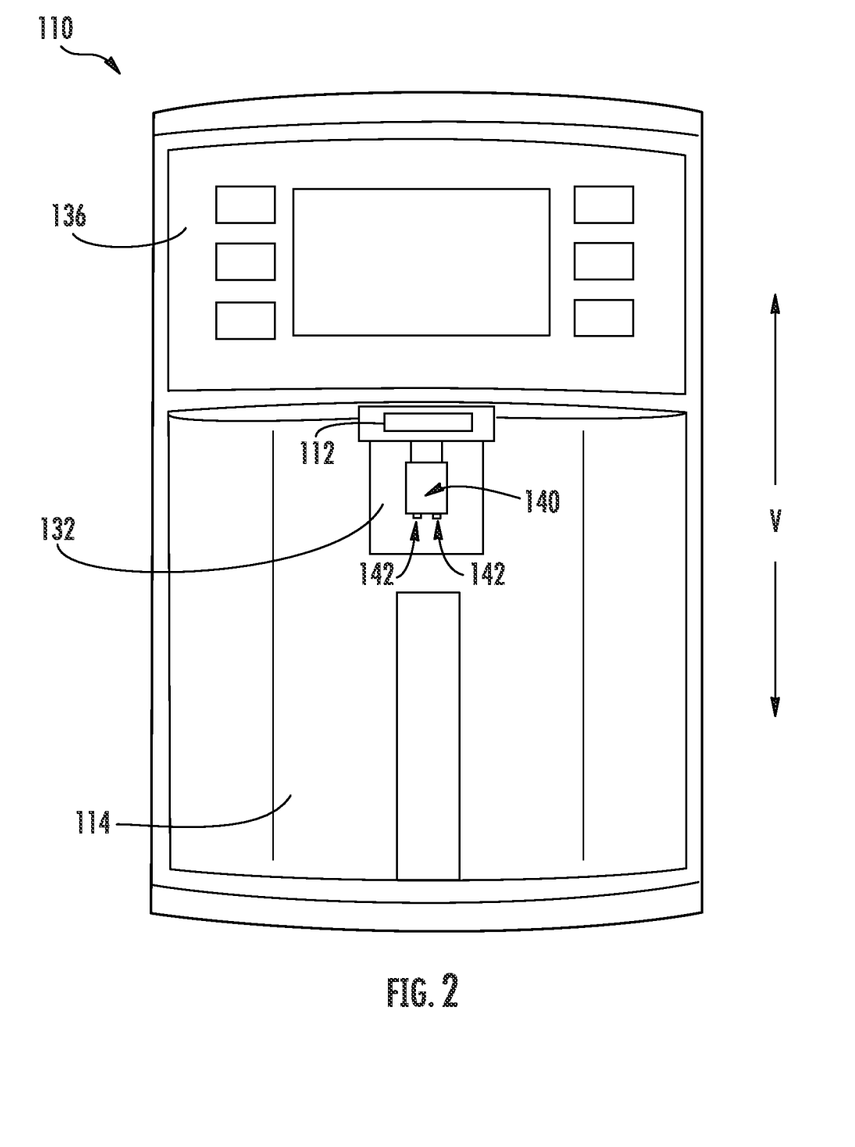
FIGS. 2 and 3 provide front, elevation views a dispensing assembly of the example appliance of FIG. 1.

FIG. 2 provides a close-up front view of the dispenser 114 of dispensing assembly 110. An exemplary nozzle 140 is positioned adjacent to an activation member 132. Nozzle 140 includes a plurality of fluid outlets 142 through which liquid water may flow into a container placed into the recess 138 of dispensing assembly 110 by a user of appliance 100. Dispensing assembly 110 may further include a sensor, such as sensor 112. Sensor 112 may be positioned above nozzle 140 within dispenser 114. In particular, sensor 112 may be positioned within an upper portion of dispenser 114 such that one or more signals generated by sensor 112 are transmitted parallel to the liquid water stream. In this manner, sensor 112 may be positioned vertically above a container placed in dispenser 114.

In example embodiments, sensor 112 may be an ultrasonic transducer configured to periodically transmit and receive high frequency sound waves, and to convert the received sound waves into electrical data. In particular, sensor 112 may be configured to generate and transmit a sound wave, and to receive one or more echoed sound waves. Sensor 112 may further be configured to determine a time interval between transmitting the sound wave and receiving the one or more echoes.

In another embodiment, sensor 112 may be a light transducer, such as, but not limited to, an infrared light sensor, a visible light sensor, or a camera. The sensor 112 configured as a light transducer may be configured to periodically transmit and receive light and to convert the received light into electrical data. In particular, sensor 112 may be configured to generate and transmit light and to receive reflected light. Sensor 112 may further be configured to determine a time interval between transmitting the light and receiving the reflected light. It will be appreciated that various other sensors and/or sensor configurations may be used, such as for instance, a sensor configuration including a separate and distinct transmitter and receiver.

Figure 3:
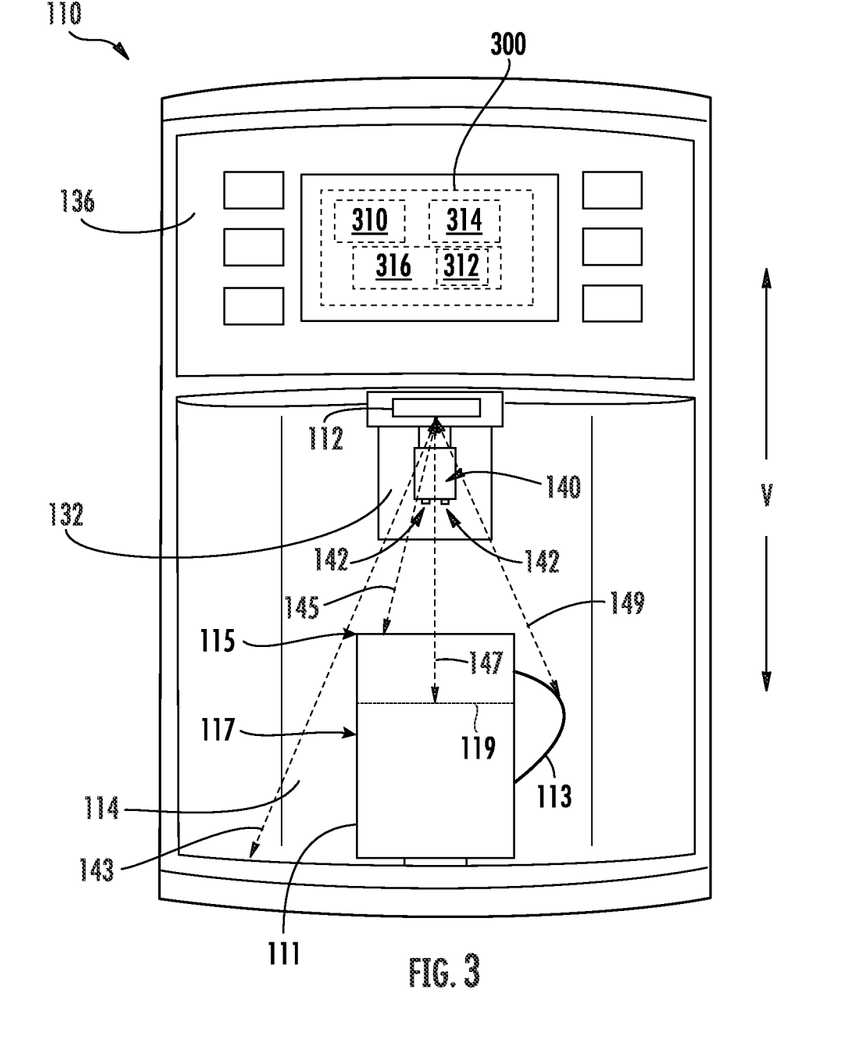

FIG. 3 provides a close-up front view of the dispenser 114 of dispensing assembly 110. In example embodiments, sensor 112 may be configured to detect a presence of a container 111 positioned proximate or within dispenser 114. For instance, sensor 112 may transmit one or more signals (e.g., sound waves, light waves, photons of light, etc.), and receive one or more signals (e.g., reflected sound waves, reflected light, etc.) indicative of container 111. In particular, the presence of a container may be detected at least in part by a comparison of a received signal with a baseline signal. The baseline signal may be a signal received by sensor 112 that is not reflected by a container. For instance, the baseline signal may be a signal transmitted by sensor 112 that is reflected, for instance, by a bottom surface of dispenser 114. Such signal may have an associated time interval corresponding to a particular known time interval (or range of time) for a signal transmitted by sensor 112 to return to sensor 112 in the absence of a container. When container 111 is positioned proximate dispenser 114, a different signal may be received corresponding at least in part to the signal reflected by container 111. Such signal may have a different corresponding time interval (or range of time), which may be indicative of the presence of container 111.

Dispenser 114 may be activated to initiate a flow of fluid (e.g., liquid water and/or ice) into container 111 in response to an input to user interface panel 136, e.g., indicative of a request to dispense liquid water or ice. As another example, dispenser 114 may be activated to initiate a flow of fluid into container 111 in response to an input to user interface panel 136 and/or in response to detecting container 111 within dispenser 114. Components of appliance 100 operable to dispense liquid water and/or ice are well known and not described in detail. As an example, the controller 300 may open a water supply line valve to dispense liquid water. As another example, the controller 300 may open an ice chute door and activate an auger motor to dispense ice. The controller 300 may immediately operate dispenser 114 to initiate the flow of fluid into container 111 in response to the input at user interface panel 136. Thus, there may be no delay or a negligible delay between the input at user interface panel 136 and dispensing of fluid into container 111. The presence of container 111 need not be detected before dispenser 114 will dispense liquid water or ice. For instance, when a user provides an input to user interface panel 136 indicative of a request to dispense liquid water, liquid water is dispensed in conjunction with the user input even if container 111 is not detected proximate dispenser 114 by sensor 112. After initiating the flow of liquid water and/or ice into container 111, sensor 112 may then be used to detect container 111, e.g., after a suitable delay, as described in greater detail below.

Sensor 112 may also be configured to detect a level of contents 119 in the container 111, such as wet or dry ingredients (e.g., ingredients for cooking or baking, or other fluids or solids as may desirably be measured where the appliance 100 is located). In one embodiment, sensor 112 is configured to detect the level, such as a height, of contents 119 in the container 111 once the presence of the container 111 has been detected. For instance, when container 111 is positioned proximate dispenser 114, various signals may be received by sensor 112 indicative of the various surfaces by which the signals are reflected. For instance, a signal may be received indicative of a bottom surface of dispenser 114 (e.g., signal 143). Such signal may correspond to the baseline signal described above. Further, a signal may be received indicative of top lip 115 of container 111 (e.g., signal 145), and a signal may be received indicative of the level or height of contents 119 within container 111 (e.g., signal 147). One or more signals may further be received indicative of the various geometries of container 111 (e.g., signal 149). For instance, container 111 includes a handle 113 extending horizontally from container 111. As shown, signal 149 is indicative of handle 113. As another example, if the container 111 has a geometry wherein a middle portion 117 of the container 111 has a larger or smaller radius than the top lip or the bottom surface of the container, a signal may be received indicative of the middle portion 117, and a different signal may be received indicative of the top lip.

In example embodiments, top lip 115 may be identified based at least in part on the first received signal by sensor 112, such that the first received signal corresponds to the surface closest to the sensor (e.g., top lip 115). In this manner, the signal indicative of top lip 115 of container 111 may be distinguished from a signal indicative of, for instance, a middle portion 117 of container 111 (e.g., handle 113), or from a signal indicative of liquid water or ice in container 111. As described above, such signals may have an associated time intervals corresponding to the time it takes for the signal to travel from sensor 112, reflect off of a surface, and be received by sensor 112. The signal indicative of top lip 115 may have the shortest associated time interval.

The controller 300 may receive the plurality of signals indicative of geometry of the container 111 and determine a volume of the container 111. The plurality of signals indicative of geometry of the container 111 may be stored by the controller 300 as calibration data. The controller 300 determines a level or volume of contents 119 in the container 111 based on the signal indicative of the height of contents in the container 111 (e.g., signal 147). In a particular embodiment, the controller 300 compares the height of contents 119 in the container 111 (e.g., corresponding to signal 147) to the calibration data (e.g., one or more signals indicative of geometry of the container 111). In certain embodiments, determining the volume of contents in the container is based on a transfer function stored by the controller 300 that corresponds the height of contents in the container (e.g., signal 147) to the geometry of the container (e.g., one or more of signal 143, 145, 149). In still certain embodiments, determining the volume of contents in the container is based on interpolating the contents volume (i.e., volume of the contents) in the container from the height of the contents (e.g., signal 147) and the calibration data.

In certain embodiments, a user generates calibration data that is received and stored by the controller 300. The user may place a container at the dispensing recess 138. The appliance 100 releases a predetermined volume of fluid into the container (e.g., volume$_1$). Controller 300 obtains signals (e.g., signal 147) via the sensor 112 and correlates the received signal to each predetermined volume. The controller 300 repeats the release of one or more additional predetermined volumes of fluid into the container (e.g., volume$_2$, volume$_3$, . . . volume N) and controller 300 obtains additional corresponding signals and correlates the received signal to each predetermined volume. In particular embodiments, the user may manually dispense the fluid into the container via the appliance 100, in which the appliance 100 measures, records, or otherwise determines the volume of fluid released via a flow meter, or calculated via a predetermined metered opening, fluid temperature, fluid pressure, fluid viscosity, fluid density, or one or more other physical properties, or combinations thereof. The user may command the appliance 100 or controller 300 to release fluid to a maximum and/or minimum volume of the desired container. The correlated signals and generated calibration data may furthermore generate a transfer function based on the desired container. Accordingly, the user may utilize any desired vessel as a measurement container without necessitating predetermined measurements, gradations, or other markings at the container.

In a particular embodiment, a user provides calibration data that is received and stored by the controller 300. The user may place a calibrated container at the dispensing recess 138 with a predetermined height of contents. The calibrated container may include a measuring cup, a graduated or graded container, or other measurement container having predetermined markings for volume of wet and/or dry contents in the container. The calibration container may be provided by the user or included with the appliance. In certain embodiments, the user may utilize a measurement device (e.g., a measuring cup) to input a predetermined volume of contents into a container without measurement markings (e.g., a coffee mug, a juice glass, a wine glass, a bowl, or other container without graded markings indicative of volume or other measurement). The non-measurement container, having the predetermined volume of contents, may be positioned at dispenser recess 138. The sensor 112 outputs a signal (e.g., signal 147) that is received by the controller 300 and the user inputs a predetermined volume or other measurement corresponding to the height of the contents 119. The predetermined height of contents is input by the user, such as via panel 136, and stored by the controller 300. A plurality of signals at various heights in the container is received by the controller 300, and the user provides volumes corresponding to the signals indicative of the height of contents in the container. In example embodiments, user provides calibration data corresponding to an empty container (i.e., no contents), a full container or maximum volume of contents in the container, and one or more measurements between the empty measurement and the maximum volume measurement. At each condition, controller 300 obtains signals (e.g., signal 147) corresponding to each condition and user corresponds each signal to a volume as indicated by the container (e.g., via graded markings or other calibrated data indicative of volume).

After calibration data is stored by the controller 300, the sensor 112 may generate a signal that may be received that is indicative of the level or height of contents 119 within container 111. In particular, when the contents are at any one or more levels or heights, the controller 300 compares the calibration data to the signal (e.g., signal 147) to determine the contents volume 119. As provided above, the comparison and determination may include interpolating the height of the contents 119 from the empty container data, the full container data, and/or one or more calibration measurements therebetween. In another example embodiment, the controller 300 stores a transfer function that determines the volume based on the height of the contents obtained by the sensor and the calibration data such as input by the user. In still another embodiment, the controller 300 generates a transfer function based on predetermined volumes of fluid dispensed by the appliance 100 into the container and correlated signals of the height and container to the predetermined volumes of fluid.

The controller 300 may further be configured to output a visual or audible signal corresponding to the determined contents volume in the container. The controller 300 may output to the panel 136 a visual signal that provides the determined or calculated measurement of contents. The panel 136 may display a quantity in a desired unit (e.g., Imperial units or metric units of volume). Additionally, or alternatively, the panel 136 may include a speaker or other device configured to output an audible signal of the determined volume to the user in a desired unit. It should be appreciated that the panel 136 may include any user input allowing for changing desired units, changing audible features (e.g., audible volume, language, dialect, accent, units, gender, etc.), changing visual features, or other user preferences.

It should be appreciated that after calibration of a non-measurement container such as provided above, similar non-measurement containers may be utilized at the refrigeration appliance 100 to obtain volume measurements of contents in the container. In example embodiments, a user may have a plurality of juice glasses of equal size and shape. Alternatively, a user may have a plurality of juice glasses of equal cross-sectional area or shape but with different heights. The user may provide predetermined volumes of contents from a measurement device to one of the juice glasses. The sensor 112 generates signals (e.g., signal 147) indicative of height of contents in the juice glass that the user then corresponds to the predetermined volume based on the measurement device. After the controller 300 obtains the calibration data, any similarly sized juice glass may be utilized to determine the volume of contents in the juice glass. The controller 300 may furthermore extrapolate volumes from juice glasses of equal cross-sectional area or shape but of taller heights. Accordingly, a user may utilize any quantity of the plurality of juice glasses to obtain accurate and consistent measurements of contents without further necessity for a measurement device such as a measuring cup.

It should be appreciated that while the example embodiment provided above utilizes a juice glass, any receptacle of any appropriate size for the dispensing recess 138 may be utilized. Embodiments provided herein the refrigeration appliance 100 and controller 300, and associated steps of a method for operation, may allow for utilizing non-measurement devices for obtaining volume measurements of wet and dry contents. Additionally, or alternatively, embodiments provided herein may improve measurement consistency and determination between users, or mitigate or eliminate the subjectivity of a user when performing a measurement. Still further, embodiments provided herein may remove issues associated with visual impairment by the user, or wear or loss of markings at a measurement device (e.g., erasure of markings at a measuring cup). Furthermore, as multiple containers may be utilized to obtain content volume, a user may obtain quicker, sequential measurements without necessitating re-use of a fewer, limited quantity of measuring cups.

Certain embodiments of the refrigerator system 100 may include the sensor 112 as a dedicated device for obtaining height of contents in the container such as provided above. In particular embodiments, the appliance 100 and controller 300 provided herein may configure one or more sensors associated with determining a level of fluid in a container to furthermore configure the sensor to determine a volume of fluid in the container.

In various embodiments, the refrigeration device 100 and controller 300 are configured to determine a level of contents 119, such as liquid water or ice, in container 111 relative to a top lip 115 of container 111. In example embodiments, sensor 112 may be configured to detect the level of the liquid water or ice 119 once the presence of a container has been detected. For instance, when a container is positioned proximate dispenser 114, various signals may be received by sensor 112 indicative of the various surfaces by which the signals are reflected. For instance, a signal may be received indicative of a bottom surface of dispenser 114 (e.g., signal 143). Such signal may correspond to the baseline signal described above. Further, a signal may be received indicative of top lip 115 of container 111 (e.g., signal 145), and a signal may be received indicative of the liquid water or ice level 119 within container 111 (e.g., signal 147). One or more signals may further be received indicative of the various geometries of container 111 (e.g., signal 149). For instance, container 111 includes a handle 113 extending horizontally from container 111. As shown, signal 149 is indicative of handle 113. As another example, if a container has a geometry wherein a middle portion 117 of the container has a larger radius than the top lip of the container, a signal may be received indicative of the middle portion 117, and a different signal may be received indicative of the top lip.

Once top lip 115 is identified, a liquid water or ice level 119 within container 111 may also be identified. In particular, as dispenser 114 dispenses liquid water or ice, the liquid water or ice level 119 within container 111 will rise. As the level rises, the time interval corresponding to the signal that reflects off of the liquid water or ice will decrease. The signal indicative of the liquid water or ice level 119 may be identified due at least in part to the change in the level of the liquid water or ice. In this manner, the signal indicative of the liquid water level may be distinguished, for instance, from a signal indicative of a protruding middle portion 117 of container 111. For instance, a signal indicative of the level of liquid water in container 111 (e.g., signal 147), and a signal indicative of a middle portion 117 of container 111 (e.g. signal 149) may each have time intervals that are less than the time interval associated with signal 143 (e.g. the baseline signal) but greater than the time interval associated with signal 145. In example embodiments, the signal indicative of the level of liquid water may be distinguished from the signal indicative of middle portion 117 due to the changing characteristics of the signal indicative of the liquid water level.

Once the signals indicative of top lip 115 and the liquid water or ice level 119 have been identified, the liquid water or ice level 119 may be measured relative to top lip 115. For instance, as the liquid water or ice level 119 rises, the distance between the liquid water or ice level 119 and top lip 115 decreases. When the distance between top lip 115 and the liquid water or ice level 119 falls below a threshold distance, dispenser 114 may be configured to cease dispensing liquid water or ice. The threshold distance may be, for instance, between about three centimeters (3 cm) and fifteen centimeters (15 cm). In example embodiments, the distance between top lip 115 and the liquid water or ice level 119 may be determined based on the difference between the time intervals of the respective signals. Dispenser 114 may be configured to cease dispensing liquid water or ice when the difference between the time intervals corresponds to the threshold distance.

In example embodiments, a signal indicative of ice in container 111 may be distinguished from a signal indicative of liquid water in container 111. For instance, a container may first contain an amount of ice when a user requests for liquid water to be dispensed, such that the rising liquid water level may not initially be detected by sensor 112 due at least in part to the presence of the ice in container 111. In such embodiments, when ice may be detected but not liquid water, dispenser 114 may be configured to blindly dispense liquid water for an initial time period although the liquid water level cannot initially be detected. For instance, the initial time period may be a predetermined time period, or may be determined at least in part from the determined height of container 111.

In alternative embodiments, dispenser 114 may be configured to blindly dispense liquid water until a liquid water level within container 111 may be detected. For instance, the initial time period may correspond to the amount of time until a level of liquid water in container 111 is detected. In this manner, once sensor 112 is able to detect the liquid water level, dispenser 114 may be configured to dispense liquid water in accordance with example embodiments of the present disclosure. For instance, dispenser 114 may be configured to dispense liquid water until the distance between the liquid water level and top lip falls 115 below the threshold distance.

In such embodiments, liquid water may still be dispensed even if the distance between the ice level and top lip 115 of container 111 is less than the threshold distance. For instance, if a level of ice is detected a half inch (0.5") from the top lip of container 111, liquid water may still be dispensed. As the liquid water is dispensed into container 111, the overall level of contents in container 111 does not initially rise. In particular, the ice level and the liquid water level will converge as the ice settles and the liquid water level 119 rises. Accordingly, in such embodiments, liquid water may be dispensed by dispenser 114 until the distance between the combined liquid water and ice level 119 and top lip 115 is less than the threshold distance.

Figure 4:
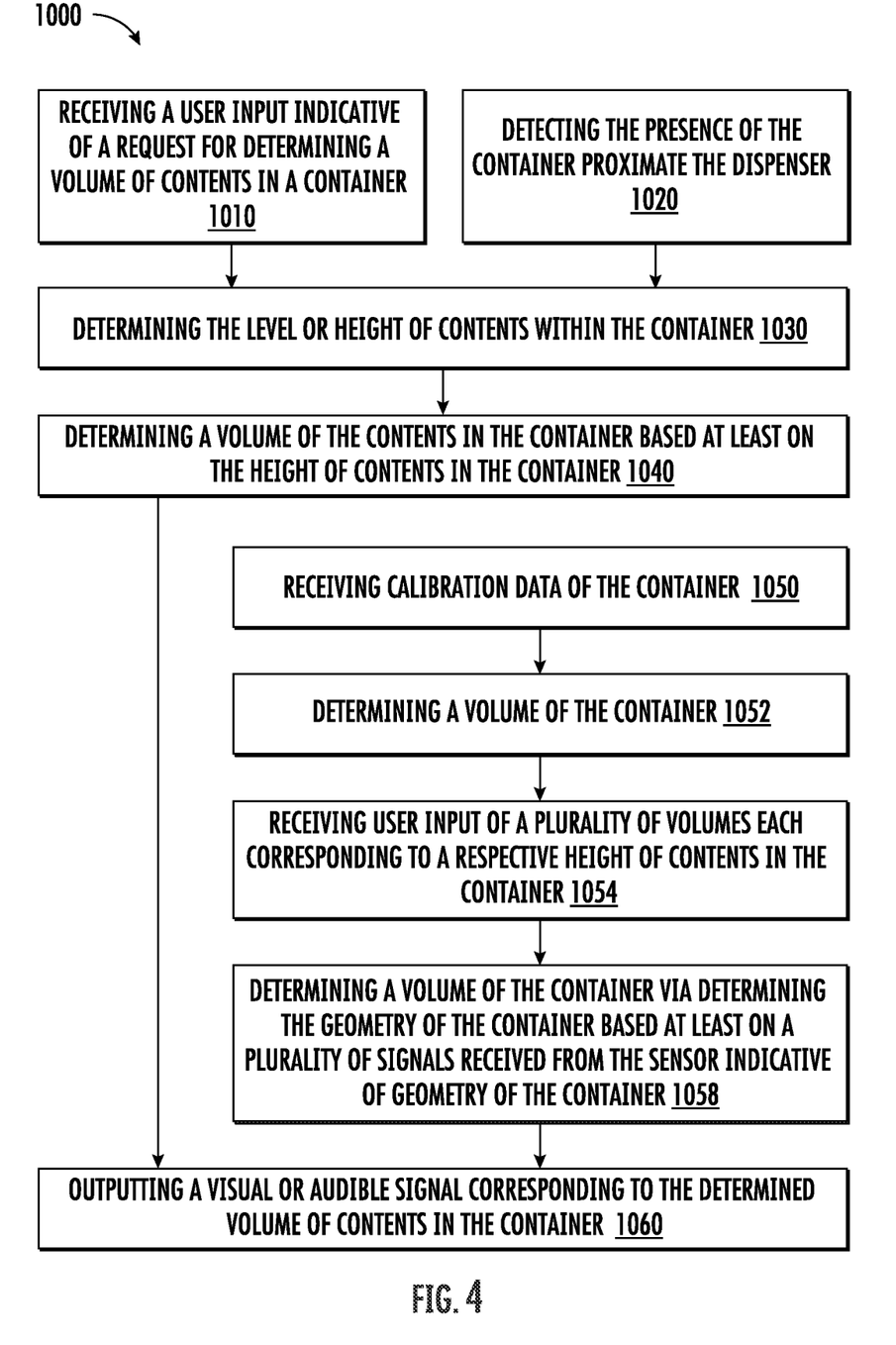
FIG. 4 illustrates a flow diagram of a method for determining a volume of contents in a container according to example embodiments of the present disclosure.

FIG. 4 depicts a flowchart outlining exemplary steps of a method for determining a volume of contents in a container (hereinafter, "method (1000)"). Steps of the method (1000) may be stored by the controller 300 and executed as operations. Steps of the method (1000) may be stored by the controller 300 and executed by embodiments of the refrigeration appliance 100 such as provided herein. As an example, method (1000) may be used in or with appliance 100 to dispense liquid water. The controller 300 of appliance 100 may be configured or programmed to implement method (1000). In addition, FIG. 4 depicts steps performed in a particular order for purposes of illustration and discussion. Those of ordinary skill in the art, using the disclosures provided herein, will understand that the steps of any of the methods disclosed herein may be modified, adapted, expanded, omitted, and/or rearranged in various ways without deviating from the scope of the present disclosure.

At (1010), method (1000) may include receiving a user input indicative of a request for determining a volume of contents in a container. The user input may include an interaction with a user interface, a verbal command, or various other suitable user inputs. At (1010), method (1000) may include receiving, such as from a sensor (e.g., sensor 112), a first signal indicative of a container positioned at a dispensing recess (e.g., dispensing recess 138) of the appliance (e.g., refrigeration appliance 100).

At (1020), method (1000) may include detecting the presence of the container proximate the dispenser. Prior to detecting the presence of the container proximate the dispenser at (1020), method (1000) may operate under the assumption that the container is proximate the dispenser without confirming the presence of the container proximate the dispenser with a sensor until (1020).

The container may be detected at (1020) based at least in part on one or more signals received from the sensor. In example embodiments, the sensor may be an ultrasonic transducer configured to transmit one or more high frequency sound waves, and to receive one or more reflected high frequency sound waves. The sound waves received by the sensor may have associated time intervals corresponding to an amount of time between the transmission of the sound wave and reception of the corresponding reflected sound wave. In another example embodiment, the sensor may be a light transducer configured to periodically transmit and receive light and to convert the received light into electrical data. In particular, the sensor may be configured to generate and transmit light and to receive reflected light. Sensor may further be configured to determine a time interval between transmitting the light and receiving the reflected light. The presence of the container may be detected at least in part on a comparison between the time interval of a received sound wave or light and a baseline time interval associated with a baseline signal. The baseline time interval may correspond to the amount of time between transmission of a sound wave or light by the sensor and reception of the sound wave or light when no container is present proximate the dispenser.

The method (1000) may also include at (1030) determining the level or height of contents (e.g., wet or dry ingredients) within the container. The method (1000) at (1030) may include receiving, such as from the sensor, a second signal indicative of a height of contents in the container. The level or height of contents may be determined at least in part from the one or more signals received from the sensor. The method (1000) at (1030) may further include detecting a level of contents within the container based at least on distinguishing a signal indicative of the level of contents within the container from the signal indicative of the lower portion of the container and from the signal indicative of the top lip of the container.

The method (1000) includes at (1040) determining a volume of the contents (i.e., contents volume) in the container based at least on the height of contents in the container. In certain embodiments, the method (1000) at (1040) includes comparing the height of contents in the container to calibration data corresponding to the container. The method (1000) may include at (1050) obtaining or receiving calibration data of the container. Receiving or obtaining calibration data may include one or more input signals each including a user input height of contents in a container and a corresponding user input volume of the contents. Certain embodiments of the method (1000) include at (1052) determining a volume of the container. The volume of the container may be determined via one or more signals obtained of the container at which the contents is positioned. In certain embodiments, the volume of the container may be determined via one or more signals obtained of a similar container to which the contents are positioned. As provided herein, the similar container may include any one or more containers having an equal cross-sectional area, shape, height, or volume, or combinations thereof, relative to the container in which the contents are contained.

In still certain embodiments, the calibration data, such as the volume of the container, may be predetermined, such as via a measuring device (e.g., measuring cup). The method (1000) may include at (1054) receiving user input of a plurality of volumes each corresponding to a respective height of contents in the container. In an example embodiment, the contents are measured in a measuring device then provided to the container. The container is provided to the dispensing recess and signal(s) are received and obtained of the contents, the container, or both. The user may input signals indicating the volume of the contents (such as indicated by the measuring device or predetermined volume of contents released by the appliance into the container) relative to each obtained height of contents.

In certain embodiments, the method (1000) may include at (1056) determining a volume of the container via determining the geometry of the container based at least on a plurality of signals received from the sensor indicative of geometry of the container. Determining the volume of the container may include obtaining, via the sensor, a signal (e.g., signal 145) indicative of the top lip or upper portion of the container. Determining the volume of the container may include obtaining, via the sensor, a signal (e.g., signal 143) indicative of the bottom surface of the container. Determining the volume of the container may include obtaining, via the sensor, a signal (e.g., signal 149) indicative of the middle portion of the container. The plurality of signals (e.g., 143,

145, 149) may together indicate the geometry of the container. The plurality of signals may obtain one or more cross-sectional areas that may be utilized to determine the volume of the container.

The method (1000) at (1040) may include interpolating and/or extrapolating the volume of the contents of the container from the height of contents in the container and the calibration data. In an example embodiment, the calibration data including predetermined or user input heights of contents and corresponding volume may be interpolated to determine the volume of contents in the container based at least on the level or height of the contents. In another example embodiment, the volume of contents in the container may be extrapolated based on calibration data including predetermined or user input heights of contents and corresponding volume and the level or height of the contents received from the signal.

In still particular embodiments, the method (1000) at (1040) may include determining, via a transfer function, the volume of the contents in the container based on the height of contents in the container and the calibration data.

The method (1000) may include at (1060) outputting or transmitting a visual or audible signal corresponding to the determined volume of contents (i.e., determined contents volume) in the container. As provided herein, the visual or audible signal may include a depiction, wording, drawing, or voice telling the user the determined volume of contents in the container.

Referring back to FIG. 3, embodiments of the controller 300 may include any appropriate computing device, circuitry, processor, and/or memory configured to store, process, determine, obtain, receive, or execute any one or more operations or steps, such as steps of method (1000) provided herein. It should be appreciated that the processor(s) 314 and the memory device(s) 316 may be integrated as a single component. As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory device 316 can generally include any appropriate primary storage device or secondary storage device, including, but not limited to, volatile storage memory, non-volatile storage memory, and/or other suitable memory elements, or combinations thereof.

The controller 300 may include a communications interface module 310. In various embodiments, the communications interface module 310 may include associated electronic circuitry that is used to send and receive data or signals. As such, the communications interface module 310 can be used to receive signals from the sensor(s) 112, output or transmit a visual and/or audible signal to the user (e.g., via operable communication with the panel 136), receive calibration data from the user (e.g., via panel 136), or receive, obtain, transmit, or execute any one or more steps of the method (1000) provided herein.

It should be appreciated that the communications interface module 310 can be any combination of suitable wired and/or wireless communications interfaces and, thus, can be communicatively coupled to one or more components of the refrigeration appliance 100 via a wired and/or wireless connection. In example embodiments, the communications interface module 310 is configured to wirelessly communicate with an external device, such as a smartphone, tablet computing device, wearable computing device (e.g., watch, glasses, eyepiece, etc.), personal computing device (e.g., laptop or desktop computer), or vehicle including one or more computing devices. The communications interface module 310 may particularly be configured to transmit or output, via a wireless connection (e.g., Wi-Fi, Bluetooth, or other appropriate communications medium) signals corresponding to the determined volume of contents in the container. The controller 300 may include control logic 312 stored in the memory device(s) 316. The control logic 312 may include computer-readable instructions that, when executed by the one or more processors 314, cause the one or more processors 314 to perform operations, such as outlined in one or more steps of the method (1000) provided herein. The instructions can be software written in any suitable programming language or can be implemented in hardware, including software permanently written into the memory device(s) 316. Additionally, or alternatively, the instructions can be executed in logically and/or virtually separate threads on the processor(s) 314.

As indicated above, although the present disclosure generally contemplates a sensor associated with a dispenser configured to dispense fluid, such as liquid water or ice, the dispenser may be further configured to dispense various other suitable forms of liquid and/or ice. It should be appreciated that known sensors may be configured to detect, receive, obtain, or otherwise operate based on liquids, embodiments of the sensor 112 provided herein, and associated methods, are configured to receive, obtain, or otherwise operate based on liquids, solids, granular solids, pastes, or other physical forms of wet or dry ingredients as may be known in environments at which the refrigeration application 100 may be utilized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, the appliance comprising:
   a cabinet defining a chamber;
   a door mounted to the cabinet, the door configured for permitting selective access to the chamber of the cabinet;
   a user input panel;
   a dispenser defining a dispensing recess;
   a sensor disposed at the dispensing recess, the sensor configured to receive one or more signals indicative of a presence of a container proximate the dispensing recess and a height of contents in the container; and
   one or more control devices in operative communication with the user input panel and the sensor, the one or more control devices configured to:
      receive calibration data comprising one or more input signals each comprising an input height and a corresponding input volume for the container;
      receive one or more signals from the sensor indicative of the height of contents in the container; and
      determine a contents volume in the container based on the height of contents in the container and calibration data corresponding to the container.

2. The appliance of claim 1, wherein the one or more control devices is configured to detect the presence of the container within the dispensing recess based at least in part on the one or more signals from the sensor.

3. The appliance of claim 1, wherein the one or more control devices is configured to output a visual or audible signal corresponding to the determined contents volume in the container.

4. The appliance of claim 1, wherein the one or more control devices is configured to compare the height of contents in the container to calibration data corresponding to the container.

5. The appliance of claim 4, wherein the one or more control devices configured to compare the height of contents in the container to calibration data corresponding to the container is further configured to interpolate the contents volume in the container from a height of contents in the container and the calibration data.

6. The appliance of claim 1, wherein the one or more control devices is configured to utilize a transfer function configured to determine the contents volume in the container based on the height of contents in the container and calibration data corresponding to the container.

7. The appliance of claim 1, wherein the sensor is an ultrasonic transducer operable to periodically transmit one or more sound waves and to receive one or more reflected sound waves.

8. The appliance of claim 7, wherein the one or more reflected sound waves are indicative of the height of contents in the container.

9. The appliance of claim 1, wherein the sensor is positioned at the dispensing recess such that one or more sound waves transmitted by the sensor are transmitted parallel to a flow of fluid into the dispensing recess.

10. The appliance of claim 1, wherein the sensor is a light transducer operable to periodically transmit light and receive reflected light.

11. The appliance of claim 1, wherein the user input panel and the dispenser are positioned on the door.

12. A controller for an appliance, the controller comprising:
one or more memory devices configured to store instructions that, when executed by one or more processors, causes the controller to perform operations, the operations comprising;
receiving calibration data comprising one or more input signals each comprising an input height and a corresponding input volume of the container;
receiving, from a sensor, a first signal indicative of a container positioned at a dispensing recess of the appliance;
receiving, from the sensor, a second signal indicative of a height of contents in the container; and
determining, via a transfer function, a contents volume in the container based at least on the height of contents in the container and calibration data corresponding to the container.

13. The controller of claim 12, the operations comprising:
outputting a visual or audible signal corresponding to the determined contents volume in the container.

14. The controller of claim 12, the operations comprising:
comparing the height of contents in the container to calibration data corresponding to the container.

15. The controller of claim 14, wherein comparing the height of contents in the container to calibration data corresponding to the container comprises interpolating the contents volume in the container from a height of contents in the container and the calibration data.

16. The controller of claim 12, the operations comprising:
determining a volume of the container, wherein determining the contents volume in the container is based at least on a height of contents in the container and the determined volume of the container.

17. The controller of claim 16, wherein determining the volume of the container comprises receiving, from the sensor, one or more signals indicative of detection of one or more surfaces of the container.

* * * * *